Patented July 12, 1932

1,867,444

UNITED STATES PATENT OFFICE

KARL DIETZ AND KARL FRANK, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY

ACID-PROOF CEMENTING COMPOSITIONS

No Drawing. Application filed January 23, 1931, Serial No. 510,841, and in Germany July 30, 1925.

The present invention relates to acid-proof cementing compositions.

The water-glass cements heretofore known set only gradually when exposed to the action of air. The setting could be promoted by acidifying, i. e. by coating the cementing compositions with an acid of any kind, or by artificially drying them.

We have now found that water-glass cements can be prepared which independent from the access of air only set by an internal chemical reaction if to the water-glass such solid substances are added as are capable of reacting with the caustic soda solution of the water-glass. All these substances must have the same property of reacting with the caustic soda solution of the water-glass, thus forming or separating more or less acid-in-soluble solid substances. During this operation the silicic acid contained in the water-glass is converted into the solid form by the elimination of the alkali which is necessary for keeping the water-glass in a liquid condition.

As such substances there may be used alkali silicon-fluorides, for instance sodium silicon-fluoride and potassium silicon-fluoride.

For the preparation of cementing compositions these substances are finely pulverized and mixed while stirring with the water-glass solutions prepared according to known processes. Small additions of 2-4 per cent of these substances are generally sufficient for obtaining a self-hardening water-glass cement. To the cementing compositions there may likewise be added such substances as increase the plasticity of the masses. The silicates of alumina, for instance pulverized chamotte, and the like and the sulfates of the alkaline earth metals possess these properties. The silico-fluorides are more efficacious in their reaction than the mineral substances so that they need only to be used in small quantities; the cementing compositions may be filled up with indifferent filling agents, such as for instance quartz sand, pulverized biscuit, pulverized chamotte and the like.

The size of grain of the filling agents depends upon the purpose for which the mortar is intended. If larger quantities of the material are required, use is made of coarse-grained mixtures of sand and chips, whereby acid-proof concrete mixtures are obtained.

The following examples serve to illustrate our invention, but they are not intended to limit it thereto; we use, for instance, the following mixtures:

(1) 40 grams of $Na_2SiF_6$, 940 grams of quartz, 20 grams of clay and 300 grams of water-glass of 38° Bé.

(2) 50 grams of $K_2SiF_6$, 920 grams of quartz, 30 grams of clay and 300 grams of water-glass of 38° Bé.

This application contains subject matter in common with our applications Serial Nos. 125.325 and 245.036 filed on July 27, 1926 and January 6, 1928.

We claim:

1. Acid-proof cementing compositions consisting of a mixture of water-glass, an acid-proof filling agent and a small quantity of an alkali silicon-fluoride.

2. Acid-proof cementing compositions consisting of a mixture of water-glass, an acid-proof filling agent and a small quantity of sodium silicon-fluoride.

3. Acid-proof cementing compositions consisting of a mixture of water-glass, quartz, clay and a small quantity of an alkali silicon-fluoride.

4. Acid-proof cementing compositions consisting of a mixture of 300 parts of water-glass of 38° Bé., 940 parts of quartz, 20 parts of clay and 40 parts of sodium silicon-fluoride ($Na_2SiF_6$).

In testimony whereof, we affix our signatures.

KARL DIETZ.
KARL FRANK.